United States Patent
Kim et al.

(10) Patent No.: US 9,548,515 B2
(45) Date of Patent: Jan. 17, 2017

(54) ELECTROLYTE FOR LITHIUM SECONDARY BATTERY AND LITHIUM SECONDARY BATTERY COMPRISING SAME

(71) Applicant: SK INNOVATION CO., LTD., Seoul (KR)

(72) Inventors: Jin Sung Kim, Daejeon (KR); Yu Na Shim, Daejeon (KR); Seong Il Lee, Daejeon (KR); Jong Ho Lim, Daejeon (KR)

(73) Assignee: SK Innovation Co., LTD., Seoul (KR)

( * ) Notice: Subject to any disclaimer, the term of this patent is extended or adjusted under 35 U.S.C. 154(b) by 0 days.

(21) Appl. No.: 14/765,209

(22) PCT Filed: Dec. 6, 2013

(86) PCT No.: PCT/KR2013/011277
§ 371 (c)(1),
(2) Date: Jul. 31, 2015

(87) PCT Pub. No.: WO2015/083861
PCT Pub. Date: Jun. 11, 2015

(65) Prior Publication Data
US 2016/0285127 A1      Sep. 29, 2016

(51) Int. Cl.
*H01M 10/0567* (2010.01)
*H01M 10/0569* (2010.01)
*H01M 10/0525* (2010.01)

(52) U.S. Cl.
CPC ..... *H01M 10/0567* (2013.01); *H01M 10/0525* (2013.01); *H01M 10/0569* (2013.01); *H01M 2300/0028* (2013.01)

(58) Field of Classification Search
CPC .................... H01M 10/0567; H01M 10/0525; H01M 10/0569; H01M 2300/0028
See application file for complete search history.

(56) References Cited

U.S. PATENT DOCUMENTS

| | | | |
|---|---|---|---|
| 5,879,834 | A | 3/1999 | Mao |
| 2006/0269843 | A1 | 11/2006 | Usami et al. |
| 2007/0243470 | A1 | 10/2007 | Yamamoto et al. |
| 2013/0004861 | A1* | 1/2013 | Yu .................... C07C 255/46 429/336 |

FOREIGN PATENT DOCUMENTS

| | | |
|---|---|---|
| JP | 2002-260725 | 9/2002 |
| KR | 1020060130441 | 12/2006 |
| KR | 1020090056739 | 6/2009 |
| KR | 1020130003583 | 1/2013 |

* cited by examiner

*Primary Examiner* — Stewart Fraser
(74) *Attorney, Agent, or Firm* — IP & T Group LLP

(57) ABSTRACT

Provided are an electrolyte for a high-voltage lithium secondary battery and a high-voltage lithium secondary battery containing the same, and more particularly, an electrolyte for a high-voltage lithium secondary battery which may not be oxidized and decomposed at the time of being kept at a high voltage and a high temperature to prevent swelling of a battery through suppression of gas generation, thereby having excellent high-temperature storage characteristics and excellent discharge characteristics at a low temperature while decreasing a thickness increase rate of the battery, and a high-voltage lithium secondary battery containing the same.

13 Claims, 1 Drawing Sheet

ELECTROLYTE FOR LITHIUM SECONDARY BATTERY AND LITHIUM SECONDARY BATTERY COMPRISING SAME

This application is a national stage application of PCT/KR2013/011277 filed on Dec. 6, 2013. The disclosure of each of the foregoing applications is incorporated herein by reference in its entirety.

TECHNICAL FIELD

The present invention relates to an electrolyte for a high-voltage lithium secondary battery and a high-voltage lithium secondary battery containing the same, and more particularly, to an electrolyte for a high-voltage lithium secondary battery which may not be oxidized and decomposed at the time of being kept at a high voltage and a high temperature to prevent swelling of a battery through suppression of gas generation, thereby having excellent high-temperature storage characteristics and excellent discharge characteristics at a low temperature while decreasing a thickness increase rate of the battery, and a high-voltage lithium secondary battery containing the same.

BACKGROUND ART

Recently, as a portable electronic device has widely spread, in accordance with rapid miniaturization, lightness, and thinness of the portable electronic device as described above, in a battery, which is a power supply of the portable electronic device, development of a secondary battery capable of having a small size and having a light weight, and being charged and discharged for a long period of time while having excellent high rate capability has been urgently demanded.

Among the currently applied secondary batteries, a lithium secondary battery developed in the early 1990s has been spotlighted due to advantages such as a high operation voltage and significantly high energy density as compared to conventional batteries using an aqueous electrolyte such as a Ni-MH battery, a Ni—Cd battery, and a lead sulfate battery, and the like. However, in the lithium secondary battery as described above, there are safety problems such as ignition and explosion, and the like, caused by using a non-aqueous electrolyte. As a capacity density of the battery is increased, this problem becomes more severe.

In a non-aqueous electrolyte secondary battery, there is a serious problem such as safety deterioration of the battery generated at the time of continuous charge. One of the causes affecting safety of the battery is heat generation due to collapse of a cathode structure. An operation principle thereof is as follows. That is, a cathode active material of a non-aqueous electrolyte battery is composed of lithium, a lithium containing metal oxide capable of intercalating and releasing lithium ions, and/or the like, and as a large amount of lithium is detached at the time of over-charge, a structure of the cathode active material as described above is changed to a thermally unstable structure. In this over-charge state, when a battery temperature reaches a critical temperature due to external physical impact, for example, exposure to a high temperature, or the like, oxygen is released from the cathode active material having an unstable structure, and the released oxygen generates an exothermal decomposition reaction with an electrolyte solvent, or the like. Particularly, since combustion of the electrolyte is further accelerated by oxygen released from a cathode, the battery may be ignited and ruptured due to thermal runaway caused by a series of exothermic reactions as described above.

In order to suppress the above-mentioned ignition or rupture due to an increase in a temperature in the battery, a method of adding an aromatic compound to the electrolyte as a redox shuttle additive has been used. For example, a non-aqueous lithium ion battery capable of preventing over-charge current and a thermal runaway phenomenon caused by the over-charge current by using an aromatic compound such as biphenyl has been disclosed in Japanese Patent No. 2002-260725. In addition, a method of improving safety of a battery by adding a small amount of an aromatic compound such as biphenyl, 3-chlorothiophene, or the like, to increase an internal resistance by electrochemical neutralization in an abnormal over-voltage state has been disclosed in U.S. Pat. No. 5,879,834.

However, in the case of using the additive such as biphenyl, or the like, there are problems in that when a relatively high voltage is locally generated in a general operation voltage, the additive is gradually decomposed during a charge and discharge process, or when the battery is discharged at a high temperature for a long period of time, an amount of biphenyl, or the like, may be gradually decreased, such that safety may not be secured after 300 charge and discharge cycles. In addition, there is a problem in storage characteristics, or the like.

Meanwhile, as a method of increasing an electricity charge amount for a small size and high capacity of the battery, a high voltage battery (4.4V system) has been continuously studied and developed. Even in the same battery system, when a charge voltage is increased, a charge amount is generally increased. However, safety problems such as decomposition of the electrolyte, a shortage of a space for lithium intercalation, a risk due to a potential rise of an electrode, or the like, may occur. Therefore, in order to manufacture a battery that may be used at a high voltage, overall conditions are managed with a system so that a large standard reduction potential difference between an anode active material and a cathode active material may be easily maintained, and an electrolyte is not decomposed at this voltage.

Considering this point of the high voltage battery, it may be appreciated that in the case of using existing over-charge preventing agents such as biphenyl (BP) or cyclohexylbenzene (CHB) used in a general lithium ion battery, even during a normal charge and discharge operation, large amounts of these over-charge preventing agents may be decomposed, and characteristics of the battery may be rapidly deteriorated even at a slightly high temperature, such that a life cycle of the battery may be decreased. Further, in the case of using a generally used non-aqueous carbonate based solvent as an electrolyte, when a battery is charged at a voltage higher than 4.2V, which is a general charge potential, oxidizing power may be increased, such that as charge and discharge cycles are performed, a decomposition reaction of the electrolyte is carried out, such that life cycle characteristics may be rapidly deteriorated.

Therefore, a method for improving safety and capacity of a battery at the time of high temperature storage without deteriorating life cycle characteristics of a high voltage battery (4.4V system) has been continuously demanded.

DISCLOSURE

Technical Problem

An object of the present invention is to provide an electrolyte for a high voltage lithium secondary battery capable of significantly decreasing a swelling phenomenon of a battery due to oxidation/decomposition of the electrolyte at a high voltage state while properly maintaining basic performance such as high rate charge and discharge characteristics, life cycle characteristics, and the like, to thereby have excellent high-temperature storage characteristics and discharge characteristics at a low temperature, and a high voltage lithium secondary battery containing the same.

Technical Solution

In one general aspect, an electrolyte for a high-voltage lithium secondary battery contains:
a lithium salt;
a non-aqueous organic solvent; and
a silanyloxy nitrile compound represented by the following Chemical Formula 1:

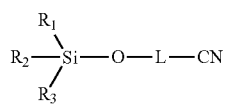

[Chemical Formula 1]

in Chemical Formula 1, $R_1$ to $R_3$ are each independently (C1-C7)alkyl groups; and L is a (C2-C10) alkylene group, the alkylene group of L being further substituted with a (C1-C5) alkyl group.

$R_1$ to $R_3$ may be each independently methyl, ethyl, propyl, butyl, pentyl, hexyl, or heptyl; and L may be ethylene, propylene, butylene, pentylene, hexylene, heptylene, octylene, nonylene, or decylene, wherein ethylene, propylene, butylene, pentylene, hexylene, heptylene, octylene, nonylene, or decylene of L may be further substituted with at least one substituent selected from the group consisting of methyl, ethyl, propyl, butyl, and pentyl, respectively.

The silanyloxy nitrile compound may be selected from silanyloxy nitrile compounds having the following structures.

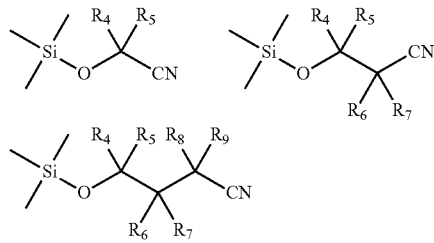

$R_4$ to $R_9$ may be each independently hydrogen, methyl, ethyl, propyl, butyl, or pentyl.

The silanyloxy nitrile compound may be contained at a content of 1 to 20 wt % based on a total weight of the electrolyte.

The electrolyte may further contain one or two or more additives selected from the group consisting of oxalatoborate based compounds, carbonate based compounds substituted with fluorine, vinylidene carbonate based compounds, and compounds containing a sulfinyl group.

The electrolyte may further contain an additive selected from the group consisting of lithium difluoro(oxalato)borate (LiFOB), lithium bis(oxalato)borate (LiB($C_2O_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

The additive may be contained at a content of 0.1 to 5.0 wt % based on a total weight of the electrolyte.

The non-aqueous organic solvent may be selected from cyclic carbonate based solvents, linear carbonate based solvents, and a mixed solvent thereof, wherein the cyclic carbonate may be selected from the group consisting of ethylene carbonate, propylene carbonate, butylene carbonate, vinylene carbonate, vinylethylene carbonate, fluoroethylene carbonate, and a mixture thereof, and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

The non-aqueous organic solvent may be a mixed solvent in which the linear carbonate solvent and the cyclic carbonate solvent are mixed at a mixed volume ratio of 1:1 to 9:1.

The lithium salt may be one or two or more selected from the group consisting of LiPF$_6$, LiBF$_4$, LiClO$_4$, LiSbF$_6$, LiAsF$_6$, LiN(SO$_2$C$_2$F$_3$)$_2$, LiN(CF$_3$SO$_2$), LiN(SO$_3$C$_2$F$_3$)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$)(C$_y$F$_{2y+1}$SO$_2$) (here, x and y are natural numbers), LiCl, LiI, and LiB(C$_2$O$_4$)$_2$.

The lithium salt may be contained at a concentration of 0.1 to 2.0 M.

In other general aspect, a lithium secondary battery contains the electrolyte for a high-voltage lithium secondary battery as described above.

Advantageous Effects

An electrolyte for a high-voltage lithium secondary battery according to the present invention contains a linear aliphatic hydrocarbon compound in which a tri-substituted silanyloxy group and a nitrile group are introduced at both sides thereof, such that a swelling phenomenon of a battery due to oxidation/decomposition of the electrolyte at a high voltage state may be significantly decreased, and thus, the electrolyte may have excellent discharge characteristics even at a low temperature as well as excellent high-temperature storage characteristics.

Further, a high-voltage lithium secondary battery containing the electrolyte for a high-voltage lithium secondary battery according to the present invention may significantly decrease a swelling phenomenon of the battery due to oxidation/decomposition of the electrolyte at a high voltage state while properly maintaining basic performance such as high rate charge and discharge characteristics, life cycle characteristics, and the like, thereby having excellent discharge characteristics even at a low temperature as well as excellent high-temperature storage characteristics.

DESCRIPTION OF DRAWINGS

The above and other objects, features and advantages of the present invention will become apparent from the following description of preferred embodiments given in conjunction with the accompanying drawings, in which.

BEST MODE

Figure 1:
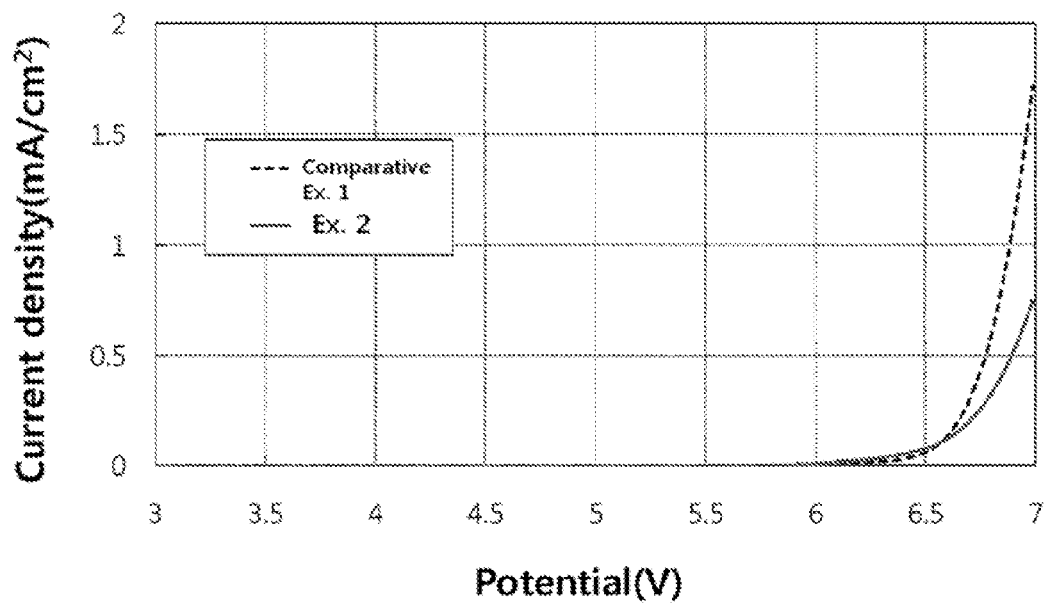
FIG. 1 is a graph illustrating measurement results of oxidative decomposition potentials of Example 2 and Comparative Example 1.

Hereinafter, the present invention will be described in more detail. Here, technical terms and scientific terms used in the present specification have the general meaning understood by those skilled in the art to which the present invention pertains unless otherwise defined, and a description for the known function and configuration unnecessarily obscuring the gist of the present invention will be omitted in the following description.

The present invention relates to an electrolyte for a high-voltage lithium secondary battery for providing a battery having excellent high-temperature storage characteristics and life cycle characteristics while securing safety of the battery at a high-voltage state.

The present invention provides an electrolyte for a high-voltage lithium secondary battery containing a lithium salt; a non-aqueous organic solvent; and a silanyloxy nitrile compound represented by the following Chemical Formula 1:

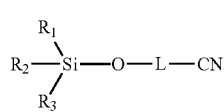

[Chemical Formula 1]

in Chemical Formula 1, $R_1$ to $R_3$ are each independently (C1-C7)alkyl groups; and L is a (C2-C10) alkylene group, the alkylene group of L being further substituted with a (C1-C5) alkyl group.

Among nitrile compounds, in the case of a nitrile compound having only an ether bond, the ether bond may become weak at a high voltage, which causes side reactions in a battery, such that high-temperature storage efficiency and low-temperature discharge efficiency may be deteriorated, and at the time of keeping the battery at a high temperature for a long period of time, a thickness increase rate of the battery may be increased. However, the electrolyte for a secondary battery according to the present invention contains a linear aliphatic hydrocarbon compound in which a tri-substituted silanyloxy group and a nitrile group are introduced at both sides thereof, that is, a silicon (Si)-oxygen (O) bond stable at a high voltage, such that side reactions in a battery may be suppressed, and thus a swelling phenomenon of a battery due to oxidation/decomposition of the electrolyte at a high voltage state may be significantly decreased. Therefore, the electrolyte may have excellent discharge characteristics even at a low temperature as well as excellent high-temperature storage characteristics.

In the electrolyte for a high-voltage lithium secondary battery according to an exemplary embodiment of the present invention, in Chemical Formula 1, $R_1$ to $R_3$ may be each independently methyl, ethyl, propyl, butyl, pentyl, hexyl, or heptyl; and L may be ethylene, propylene, butylene, pentylene, hexylene, heptylene, octylene, nonylene, or decylene, wherein ethylene, propylene, butylene, pentylene, hexylene, heptylene, octylene, nonylene, or decylene of L may be further substituted with at least one substituent selected from the group consisting of methyl, ethyl, propyl, butyl, and pentyl, respectively. Most preferably, the silanyloxy nitrile compound may be selected from silanyloxy nitrile compounds having the following structures.

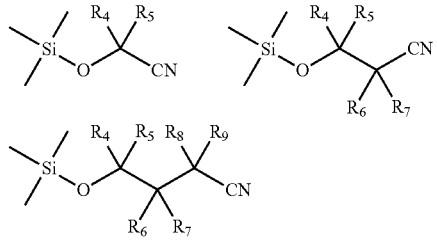

$R_4$ to $R_9$ may be each independently hydrogen, methyl, ethyl, propyl, butyl, or pentyl.

In the electrolyte for a high-voltage lithium secondary battery according to an exemplary embodiment of the present invention, the silanyloxy nitrile compound represented by Chemical Formula 1 may be contained at a content of 1 to 20 wt %, more preferably 1 to 15 wt % based on a total weight of the electrolyte for a secondary battery. When the content of the silanyloxy nitrile compound represented by Chemical Formula 1 is less than 1 wt %, addition effects such as suppression of the swelling phenomenon of the battery during high-temperature storage, improvement of a capacity retention rate, or the like, are not exhibited, and an effect of improving discharge capacity, output, or the like, of the lithium secondary battery may be insufficient, and when the content is more than 20 wt %, a life cycle is rapidly deteriorated, or the like, such that characteristics of the lithium secondary battery may be rather deteriorated.

In the electrolyte for a high-voltage lithium secondary battery according to an exemplary embodiment of the present invention, the electrolyte may further contain one or two or more additives selected from the group consisting of oxalatoborate based compounds, carbonate based compounds substituted with fluorine, vinylidene carbonate based compounds, and compounds containing a sulfinyl group as a life cycle improving additive for improving the life cycle of the battery.

The oxalatoborate based compound may be a compound represented by the following Chemical Formula 2 or lithium bis(oxalato)borate (LiB($C_2O_4$)$_2$, LiBOB).

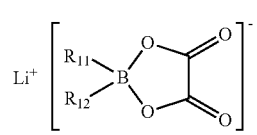

[Chemical Formula 2]

(In Chemical Formula 2, $R_{11}$, and $R_{12}$ are each independently a halogen atom or halogenated (C1 to C10)alkyl group.)

Specific examples of the oxalatoborate based additive may include lithium difluoro(oxalato)borate (LiB($C_2O_4$)$F_2$, LiFOB), lithium bis(oxalato)borate (LiB($C_2O_4$)$_2$, LiBOB), or the like.

The carbonate based compound substituted with fluorine may be fluoroethylene carbonate (FEC), difluoroethylene carbonate (DFEC), fluorodimethyl carbonate (FDMC), fluoroethyl methyl carbonate (FEMC), or a combination thereof.

The vinylidene carbonate based compound may be vinylene carbonate (VC), vinyl ethylene carbonate (VEC), or a mixture thereof.

The compound containing a sulfinyl (S=O) group may be sulfone, sulfite, sulfonate, and sultone (cyclic sulfonate), and the compound may be used alone or a mixture thereof may be used. In detail, the sulfone may be represented by the following Chemical Formula 3 and be divinyl sulfone. The sulfite may be represented by the following Chemical Formula 4 and be ethylene sulfite or propylene sulfite. Sulfonate may be represented by the following Chemical Formula 5 and be diallyl sulfonate. In addition, non-restrictive examples of sultone may include ethane sultone, propane sultone, butane sultone, ethene sultone, butene sultone, propene sultone, and the like.

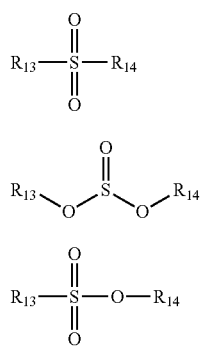

[Chemical Formula 3]

[Chemical Formula 4]

[Chemical Formula 5]

(In Chemical Formulas 3 to 5, $R_{13}$ and $R_{14}$ are each independently hydrogen, a halogen atom, a (C1-C10)alkyl group, a (C2-C10)alkenyl group, a (C1-C10)alkyl group substituted with halogen, or a (C2-C10)alkenyl group substituted with halogen.)

More preferably, the electrolyte for a high-voltage lithium secondary battery according to an exemplary embodiment of the present invention may further contain an additive selected from the group consisting of lithium difluoro(oxalato)borate (LiFOB), lithium bis(oxalato)borate (LiB($C_2O_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

In the electrolyte for a high-voltage lithium secondary battery according to an exemplary embodiment of the present invention, a content of the additive is not particularly limited, but in order to improve the life cycle of the battery, the additive may be contained in the electrolyte for a lithium secondary battery at a content of 0.1 to 5 wt %, more preferably 0.1 to 3 wt % based on a total weight of the electrolyte.

In the electrolyte for a high-voltage lithium secondary battery according to an exemplary embodiment of the present invention, the non-aqueous organic solvent may include carbonate, ester, ether, or ketone alone, or a mixed solvent thereof, but it is preferable that the non-aqueous organic solvent is selected from cyclic carbonate based solvents, linear carbonate based solvents, and a mixed solvent thereof. It is most preferable to use a mixture of the cyclic carbonate based solvent and the linear carbonate based solvent. The cyclic carbonate based solvent may sufficiently dissociate lithium ions due to large polarity, but has a disadvantage in that ion conductivity thereof is small due to a large viscosity. Therefore, characteristics of the lithium secondary battery may be optimized by mixing the linear carbonate solvent having a small polarity and a low viscosity with the cyclic carbonate solvent.

The cyclic carbonate based solvent may be selected from the group consisting of ethylene carbonate, propylene carbonate, butylene carbonate, vinylene carbonate, vinylethylene carbonate, fluoroethylene carbonate, and a mixture thereof, and the linear carbonate based solvent may be selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

In the electrolyte for a high-voltage lithium secondary battery according to an exemplary embodiment of the present invention, in the non-aqueous organic solvent, which is the mixed solvent of the cyclic carbonate based solvent and the linear carbonate based solvent, a mixed volume ratio of the linear carbonate based solvent and the cyclic carbonate based solvent may be 1:1 to 9:1, preferably 1.5:1 to 4:1.

In the electrolyte for a high-voltage lithium secondary battery according to an exemplary embodiment of the present invention, the lithium salt may be one or two or more selected from the group consisting of $LiPF_6$, $LiBF_4$, $LiClO_4$, $LiSbF_6$, $LiAsF_6$, $LiN(SO_2C_2F_3)_2$, $LiN(CF_3SO_2)_2$, $LiN(SO_3C_2F_5)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (here, x and y are natural numbers), LiCl, LiI, and $LiB(C_2O_4)_2$, but is not limited thereto.

The lithium salt may be used in a concentration range of preferably 0.1 to 2.0 M, and more preferably, 0.7 to 1.6M. In the case in which the concentration of the lithium salt is less than 0.1 M, conductivity of the electrolyte is decreased, such that performance of the electrolyte is deteriorated, and in the case in which the concentration is more than 2.0 M, the viscosity of the electrolyte is increased, such that movability of the lithium ion may be decreased. The lithium salt acts as a supply source of the lithium ion in the battery to enable a basic operation of the lithium secondary battery.

Since the electrolyte for a high-voltage lithium secondary battery according to an exemplary embodiment of the present invention is generally stable in a temperature range of −20 to 60° C., and maintains electrochemically stable characteristics thereof even at a voltage of 4.4 V, the electrolyte may be applied to all of the lithium secondary batteries such as a lithium ion battery, a lithium polymer battery, and the like.

In other general aspect, a high-voltage lithium secondary battery contains the electrolyte for a high-voltage lithium secondary battery as described above.

A non-restrictive example of the secondary battery may include a lithium metal secondary battery, a lithium ion secondary battery, a lithium polymer secondary battery, a lithium ion polymer secondary battery, or the like.

The high-voltage lithium secondary battery manufactured using the electrolyte for a high-voltage lithium secondary battery according to the present invention has low-temperature discharge efficiency of 81% or more and high-temperature storage efficiency of 68% or more, and at the time of keeping the high-voltage lithium secondary battery at a high temperature for a long period of time, a thickness increase rate of the battery is significantly low 3 to 14%).

The high-voltage lithium secondary battery according to the present invention includes a cathode and an anode.

It is preferable that the cathode contains a cathode active material capable of intercalating and deintercalating a lithium ion, and it is preferable that the cathode active material as described above is a complex metal oxide of at least one kind selected from cobalt, manganese, and nickel and lithium. An employment ratio between metals may be various, and an element selected from the group consisting of Mg, Al, Co, K, Na, Ca, Si, Ti, Sn, V, Ge, Ga, B, As, Zr, Mn, Cr, Fe, Sr, V, and rare earth elements may be further contained in addition to the above-mentioned metals. As a specific example of the cathode active material, a compound represented by any one of the following Chemical Formulas may be used:

$Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, 0≤c≤0.05); $LiE_{2-b}B_bO_{4-c}D_c$ (0≤b≤0.5, 0≤c≤0.05); $Li_aNi_{1-b-c}Co_bB_cD_\alpha$ (0.90≤a≤1.8, 0≤b≤0.5, 0≤c≤0.05, 0<α≤2); $Li_aNi_{1-b-c}Co_bB_cO_{2-\alpha}F_\alpha$ (0.90≤a≤1.8, 0≤b≤0.5, 0≤c≤0.05, 0<α<2); $Li_aNi_{1-b-c}Co_bB_cO_{2-\alpha}F_2$ (0.90≤a≤1.8, 0≤b≤0.5, 0≤c≤0.05, 0≤α≤2); $Li_aNi_{1-b-c}Mn_bB_cD_\alpha$ (0.90≤a≤1.8, 0≤b≤0.5, 0≤c≤0.05, 0<α≤2); $Li_aNi_{1-b-c}Mn_bB_cO_{2-\alpha}F_\alpha$ (0.90≤a≤1.8, 0≤b≤0.5, 0≤c≤0.05, 0<α<2); $Li_aNi_{1-b-c}Mn_bB_cO_{2-\alpha}F_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_2G_bO_4$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the Chemical Formulas, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The anode contains an anode active material capable of intercalating and deintercalating the lithium ion, and as this anode active material, a carbon material such as crystalloid carbon, amorphous carbon, carbon complex, a carbon fiber, or the like, a lithium metal, an alloy of lithium and another element, or the like, may be used. Examples of the amorphous carbon may include hard carbon, coke, mesocarbon microbead (MCMB) sintered at a temperature of 1500° C. or less, mesophase pitch-based carbon fiber (MPCF), and the like. Examples of the crystalloid carbon include graphite based materials, more specifically, natural graphite, graphitized coke, graphitized MCMB, graphitized MPCF, and the like. As the carbon material, a material of which a d002 interplanar distance is 3.35 to 3.38 Å, and a crystallite size Lc measured by X-ray diffraction is at least 20 nm or more may be preferable. Another element forming an alloy with lithium may be aluminum, zinc, bismuth, cadmium, antimony, silicon, lead, tin, gallium, or indium.

The cathode or anode may be prepared by dispersing an electrode active material, a binder, and a conductive material, and if necessary, a thickener, in a solvent to prepare an electrode slurry composition, and applying this electrode slurry composition onto an electrode current collector. As a cathode current collector, aluminum, an aluminum alloy, or the like, may be generally used, and as an anode current collector, copper, a copper alloy, or the like, may be generally used. The cathode current collector and the anode current collector have a foil or mesh shape.

The binder is a material playing a role in paste formation of the active material, adhesion between the active materials, adhesion with the current collector, and a buffering effect on expansion and contraction of the active material, and the like. Examples of the binder may include polyvinylidene fluoride (PVdF), a polyhexafluoropropylene-polyvinylidene fluoride copolymer (PVdF/HFP), poly(vinylacetate), polyvinyl alcohol, polyethyleneoxide, polyvinylpyrrolidone, alkylated polyethyleneoxide, polyvinyl ether, poly(methylmethacrylate), poly(ethylacrylate), polytetrafluoroethylene, polyvinylchloride, polyacrylonitrile, polyvinylpyridine, styrene-butadiene rubber, acrylonitrile-butadiene rubber, and the like. A content of the binder is 0.1 to 30 wt %, preferably 1 to 10 wt % based on the electrode active material. In the case in which the content of the binder is excessively low, adhesive force between the electrode active material and the current collector may become insufficient, and in the case in which the content is excessively high, adhesive force may be improved, but a content of the electrode active material is decreased in accordance with the content of the binder, which is disadvantageous in allowing the battery to have high capacity.

The conductive material is used to impart conductivity to the electrode, and any electronic conductive material may be used as long as it does not cause a chemical change in a battery to be configured. At least one selected from the group consisting of a graphite based conductive material, a carbon black based conductive material, and a metal or metal compound based conductive material may be used. Examples of the graphite based conductive material may include artificial graphite, natural graphite, and the like, examples of the carbon black based conductive material may include acetylene black, Ketjen black, Denka black, thermal black, channel black, and the like, and examples of the metal or metal compound based conductive material may include tin, tin oxide, tin phosphate ($SnPO_4$), titanium oxide, potassium titanate, a perovskite material such as $LaSrCoO_3$ and $LaSrMnO_3$. However, the conductive material is not limited thereto.

A content of the conductive material is preferably 0.1 to 10 wt % based on the electrode active material. In the case in which the content of the conductive material is less than 0.1 wt %, electrochemical properties may be deteriorated, and in the case in which the content is more than 10 wt %, energy density per weight may be decreased.

Any thickener may be used without limitation as long as it may serve to adjust a viscosity of the active material slurry, but for example, carboxymethyl cellulose, hydroxymethyl cellulose, hydroxyethyl cellulose, hydroxypropyl cellulose, or the like, may be used.

As the solvent in which the electrode active material, the binder, the conductive material, and the like, are dispersed, a non-aqueous solvent or aqueous solvent may be used. Examples of the non-aqueous solvent may include N-methyl-2-pyrrolidone (NMP), dimethylformamide, dimethylacetamide, N,N-dimethylaminopropylamine, ethyleneoxide, tetrahydrofuran, or the like.

The high-voltage lithium secondary battery according to the present invention may include a separator preventing a short-circuit between the cathode and the anode and providing a movement path of the lithium ion. As the separator as described above, a polyolefin based polymer membrane made of polypropylene, polyethylene, polyethylene/polypropylene, polyethylene/polypropylene/polyethylene, polypropylene/polyethylene/polypropylene, or the like, or a multilayer thereof, a micro-porous film, and woven fabric and non-woven fabric may be used. In addition, a film in which a resin having excellent stability is coated on a porous polyolefin film may be used.

The high-voltage lithium secondary battery according to the present invention may have various shapes such as a cylindrical shape, a pouch shape, in addition to an angular shape.

Hereinafter, Examples and Comparative Examples of the present invention will be described. However, the following Example is only a preferable example of the present invention, and the present invention is not limited thereto. Under the assumption that the lithium salt is entirely dissociated so that a concentration of lithium ion becomes 1 M, a base electrolyte may be formed by dissolving a corresponding amount of the lithium salt such as $LiPF_6$ in a basic solvent so as to have a concentration of 1 M.

Preparation Example 1

Synthesis of 3-trimethylsilanyloxypropionitrile
(Hereinafter, Referred to as 'PHE07')

60 mL of 3-hydroxypropionitrile and 117 mL of triethylamine were added to 800 mL of a diethylether solvent. 105 mL of chlorotrimethylsilane was slowly added thereto at 0° C. for 20 minutes, and stirred for 2 hours, thereby performing a reaction. Solid byproducts were removed by filtering after the reaction, and then, a solvent was removed by distillation under reduced pressure. After adding calcium hydride to a liquid product, moisture and impurities were removed by distillation under reduced pressure, thereby obtaining 103 g of 3-trimethylsilanyloxypropionitrile.

$^1$H NMR ($CDCl_3$, 500 MHz) δ 3.82 (t, 2H), 2.56 (t, 2H), 0.16 (s, 9H)

Comparative Preparation Example 1

Synthesis of 3-methoxypropanenitrile (Hereinafter, Referred to as 'PHE05')

A catalyst mixture composed of 5 g of N-methylpyrrolidone and 2.6 g of barium hydroxide and 53 g of acrylonitrile were added to 250 mL of a methanol/dichloromethane mixed solvent (volume ratio: 3/1) and stirred at room temperature for 7 hours. A reaction was terminated by adding 1N hydrochloric acid aqueous solution, and the resultant was neutralized by adding sodium hydrogen carbonate, followed by extraction with dichloromethane. After the extracted organic solvent layer was dried by adding magnesium sulfate, dried calcium hydride was added thereto, and moisture was removed by distillation under reduced pressure, thereby obtaining 68 g of 3-methoxypropanenitrile.

$^1$H NMR ($CDCl_3$, 500 MHz) δ 3.53 (t, 2H), 3.34 (s, 3H), 2.57 (t, 2H)

Comparative Preparation Example 2

Synthesis of 2,2'-biscyanoethyl ether (Hereinafter, Referred to as 'PHE08')

250 mL of 40% sodium hydroxide aqueous solution was added to 106 g of acrylonitrile and stirred at room temperature for 15 hours. A reaction was terminated by neutralization with 1N hydrochloric acid aqueous solution, and the resultant was diluted with chloroform. An organic solvent layer was washed with 5% sodium hydroxide aqueous solution, and washed again with saturated sodium chloride aqueous solution. The solvent was removed by distillation under reduced pressure, followed by drying, thereby obtaining a colorless liquid. Calcium hydride was added thereto, and moisture was removed by distillation under reduced pressure, thereby obtaining 118 g of purified 2,2'-biscyanoethyl ether.

$^1$H NMR ($CDCl_3$, 500 MHz) δ 3.68 (t, 4H), 2.62 (t, 4H)

Examples 1 to 6 and Comparative Examples 1 to 3

A solvent obtained by dissolving $LiPF_6$ in a mixed solvent in which ethylene carbonate (EC) and ethyl methyl carbonate (EMC) were mixed at a volume ratio of 3:7 so as to have a concentration of 1.0 M was used as a basic electrolyte (1M $LiPF_6$, EC/EMC=3:7), ingredients shown in the following Table 1 were additionally injected, thereby preparing electrolytes.

A battery to which the non-aqueous electrolyte was applied was manufactured as follows.

After mixing $LiNiCoMnO_2$ and $LiMn_2O_4$ at a weight ratio of 1:1 as a cathode active material, the active material, polyvinylidene fluoride (PVdF) as a binder, and carbon as a conductive material were mixed at a weight ratio of 92:4:4 and then dispersed in N-methyl-2-pyrrolidone, thereby preparing cathode slurry. This slurry was coated on aluminum foil having a thickness of 20 μm, dried, and rolled, thereby preparing a cathode. After mixing artificial graphite as an anode active material, styrene-butadiene rubber as a binder, and carboxymethyl cellulose as a thickener were mixed at a weight ratio of 96:2:2 and dispersed in water, thereby preparing anode active material slurry. This slurry was coated on copper foil having a thickness of 15 μm, dried, and rolled, thereby preparing an anode.

A film separator made of a polyethylene (PE) material and having a thickness of 25 μm was stacked between the prepared electrodes, and a cell was configured using a pouch having a size of 8 mm×270 mm×185 mm (thickness×length×width), followed by injection of the non-aqueous electrolyte, thereby manufacturing a 25 Ah-class lithium secondary battery for an electric vehicle (EV).

Performance of the 25 Ah-class battery for an electric vehicle (EV) manufactured as described above was evaluated as follows. Evaluation items are as follows.

\* Evaluation Item \*

1. Capacity Recovery Rate after 30 days at 60° C. (storage efficiency at a high temperature): After charging the battery at room temperature for 3 hours (12.5 A, 4.4V constant current-constant voltage (CC-CV)), the battery was kept at 60° C. for 30 days, and then, the battery was discharged to 2.7V (25 A, CC). Thereafter, usable capacity (%) with respect to initial capacity was measured.

2. Thickness Increase Rate after 30 days at 60° C.: A battery was charged to 4.4V, with 12.5 A CC-CV at room temperature for 3 hours, and thereafter, a thickness of the battery was indicated as A, and a thickness of the battery left at 60° C. by using a closed thermostatic device for 30 days under normal pressure exposed to atmosphere was indicated as B, then a thickness increase rate was calculated by following Equation 1:

$$(B-A)/A*100(\%) \quad \text{[Equation 1]}$$

3. Life cycle at room temperature: A process of charging the battery at room temperature (25 A, 4.4V, CC-CV) for 3 hours and then discharging the battery to 2.7V (25 A) was repeated 300 times. In this case, discharge capacity at a first time was defined as C, and discharge capacity at a 300th time was divided by the discharge capacity C at the first time, thereby calculating a capacity retention rate during the life cycle.

4. 1 C Discharge at −20° C. (discharge efficiency at a low temperature): After the battery was charged at room temperature for 3 hours (12.5 A, 4.4V, CC-CV), the battery was kept at −20° C. for 4 hours, and then the battery was discharged to 2.7V (25 A, CC). Then, usable capacity (%) with respect to initial capacity was measured.

TABLE 1

| | Electrolyte Composition (100 wt %) | After 30 days at 60° C. | | Capacity | |
|---|---|---|---|---|---|
| | | Capacity Recovery Rate | Thickness Increase Rate | Retention Rate during Life cycle | Discharge Capacity (−20° C.) |
| Example 1 | Basic Electrolyte + PHE07 5 wt % | 78% | 14% | 75% | 85% |
| Example 2 | Basic Electrolyte + PHE07 10 wt % | 85% | 7% | 83% | 86% |
| Example 3 | Basic Electrolyte + PHE07 15 wt % | 68% | 5% | 68% | 81% |
| Example 4 | Basic Electrolyte + PHE07 10 wt % + LiBOB 1 wt % | 91% | 8% | 85% | 85% |
| Example 5 | Basic Electrolyte + PHE07 10 wt % + VC 1 wt % | 87% | 8% | 88% | 83% |
| Example 6 | Basic Electrolyte + PHE07 10 wt % + VC 1 wt % + PS 1 wt % | 88% | 3% | 89% | 83% |
| Comparative Example 1 | Basic Electrolyte | 37% | 30% | 20% | 55% |
| Comparative Example 2 | Basic Electrolyte + PHE05 10 wt % | 40% | 20% | 25% | 61% |
| Comparative Example 3 | Basic Electrolyte + PHE08 10 wt % | 43% | 18% | 28% | 65% |

Basic Electrolyte: 1M LiPF$_6$, EC/EMC = 3:7/PHE07: Compound of Preparation Example 1/PHE05: Compound of Comparative Preparation Example 1/PHE08: Compound of Comparative Preparation Example 2/LiBOB: Lithium-bis(Oxalato)Borate/VC: Vinylene Carbonate/PS: 1,3-Propane sultone As described above, it may be appreciated that the lithium secondary battery containing the electrolyte for a secondary battery according to the present invention has low-temperature discharge efficiency of 81% or more and high-temperature storage efficiency of 68% or more. Further, it was confirmed that in Examples 1 to 6, the thickness increase rate of the battery at the time of keeping the battery at a high temperature for a long period of time was significantly low (3 to 14%) and the capacity retention rate during the life cycle was excellent (68% or more) (Examples 1 to 6). On the contrary, it was confirmed that in Comparative Examples 1 to 3, low-temperature discharge efficiency was 65% or less, high-temperature storage efficiency was 43% or less, and the thickness increase rate of the battery at the time of keeping the battery at a high temperature for a long period of time was significantly increased to 18 to 30%. In addition, the capacity retention rate during the life cycle was 28% or less, which was significantly low as compared to Examples.

Figure 2:
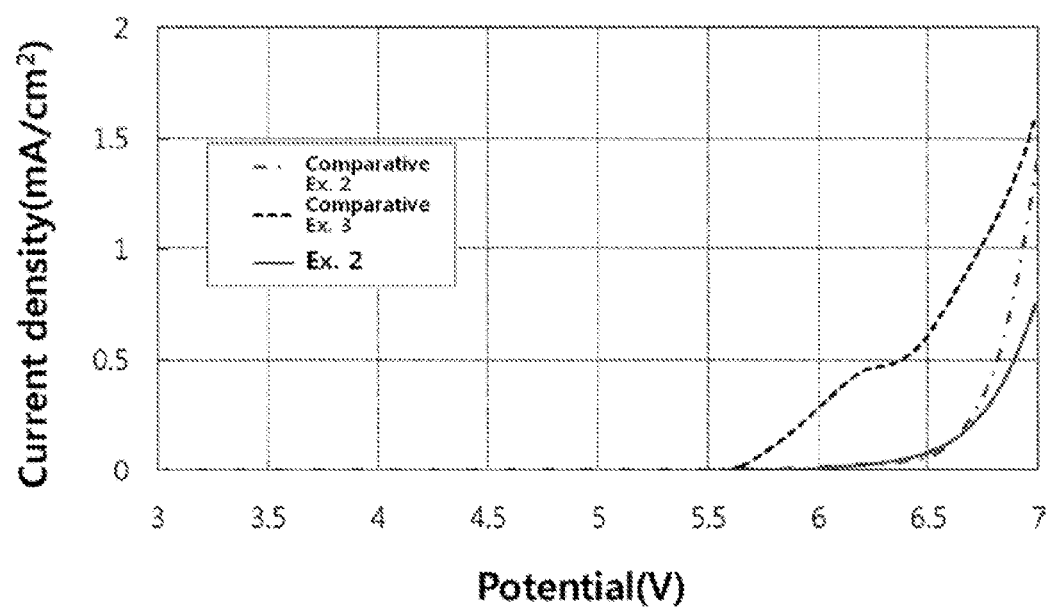
FIG. 2 is a graph illustrating measurement results of oxidative decomposition potentials of Example 2 and Comparative Examples 2 and 3.

In order to measure oxidative decomposition potentials in Example 2 and Comparative Examples 1 to 3, linear sweep voltametry (LSV) was measured using a Pt electrode as a working electrode and a Li-metal as a counter electrode and a reference electrode. As a result, it was confirmed that as compared to the basic electrolyte of Comparative Example 1, the electrolyte of Comparative Example 2 (basic electrolyte+PHE05), and the electrolyte of Comparative Example 3 (basic electrolyte+PHE08), in the electrolyte of Example 2 (basic electrolyte+PHE07 (10 wt %)), 10 wt % of PHE07 was added, such that an oxidation potential of the electrolyte was increased, and thus, the electrolyte was less decomposed at a high voltage (FIGS. 1 and 2). That is, in the case in which the silanyloxy nitrile compound was added to the basic electrolyte as in Example 2, the oxidation potential of the electrolyte was increased as compared to Comparative Examples 2 and 3 in which the nitrile compound in which a silanyloxy group was not introduced was added, such that decomposition of the electrolyte itself was suppressed at a high voltage. The reason may be due to a structural difference between the substituents introduced in the nitrile compounds.

Particularly, comparing Example 2 with Comparative Examples 2 and 3, it may be appreciated that high-temperature storage efficiency (Example 2: 85%, Comparative Example 2: 40, Comparative Example 3: 43%), the thickness increase rate of the battery at the time of keeping the battery at a high temperature for a long period of time (Example 2: 7%, Comparative Example 2: 20%, Comparative Example 3: 18%), and low-temperature discharge efficiency (Example 2: 86%, Comparative Example 2: 61%, Comparative Example 3: 65%) were significantly different depending on structures of nitrile compounds added to the basic electrolyte. The difference as described above is due to structural characteristics of the nitrile compound added to the basic electrolyte, and the silanyloxy nitrile compound according to the present invention, which is a linear aliphatic hydrocarbon compound in which a tri-substituted silanyloxy group and a nitrile group are introduced at both sides thereof, has a different structure from a linear aliphatic hydrocarbon compound of Comparative Example 2 in which an alkoxy group and a nitrile group are introduced at both sides thereof, that is, 3-methoxypropanenitrile, or a biscyanoethyl ether compound of Comparative Example 3. The nitrile compounds of Comparative Examples 2 and 3 are nitrile compounds having only an ether bond, and the ether bond may become weak at a high voltage, which causes side reactions in a battery, such that high-temperature storage efficiency and low-temperature discharge efficiency may be deteriorated, and at the time of keeping the battery at a high temperature for a long period of time, the thickness increase rate of the battery may be increased. On the contrary, the silanyloxy nitrile compound according to the present invention has a silicon (Si)-oxygen (O) bond stable at a high voltage, such that decomposition of the electrolyte may be suppressed, thereby making it possible to implement excellent battery characteristics.

However, since the electrolyte for a secondary battery according to the present invention contains the linear aliphatic hydrocarbon compound in which the tri-substituted silanyloxy group and the nitrile group are introduced at both sides thereof, side reactions in the battery may be suppressed, such that the swelling phenomenon of the battery due to oxidation/decomposition of the electrolyte at a high voltage state may be significantly decreased, and thus, the electrolyte may have excellent discharge characteristics even at a low temperature as well as excellent high-temperature storage characteristics.

Although the exemplary embodiments of the present invention have been disclosed in detail, those skilled in the art will appreciate that various modifications are possible, without departing from the scope and spirit of the invention as disclosed in the accompanying claims. Accordingly, such modifications of the embodiment of the present invention should also be understood to fall within the scope of the present invention.

INDUSTRIAL APPLICABILITY

An electrolyte for a high-voltage lithium secondary battery according to the present invention contains a linear aliphatic hydrocarbon compound in which a tri-substituted silanyloxy group and a nitrile group are introduced at both sides thereof, such that a swelling phenomenon of a battery due to oxidation/decomposition of the electrolyte at a high voltage state may be significantly decreased, and thus, the electrolyte may have excellent discharge characteristics even at a low temperature as well as excellent high-temperature storage characteristics.

Further, a high-voltage lithium secondary battery containing the electrolyte for a high-voltage lithium secondary battery according to the present invention may significantly decrease a swelling phenomenon of the battery due to oxidation/decomposition of the electrolyte at a high voltage state while properly maintaining basic performance such as high rate charge and discharge characteristics, life cycle characteristics, and the like, thereby having excellent discharge characteristics even at a low temperature as well as excellent high-temperature storage characteristics.

The invention claimed is:

1. An electrolyte for a lithium secondary battery comprising:
    a lithium salt;
    a non-aqueous organic solvent; and
    a silanyloxy nitrile compound represented by the following Chemical Formula 1:

[Chemical Formula 1]

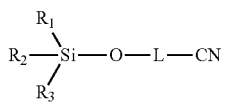

in Chemical Formula 1, $R_1$ to $R_3$ are each independently (C1-C7)alkyl groups; and L is a (C2-C10) alkylene group, the alkylene group of L being further substituted with a (C1-C5) alkyl group.

2. The electrolyte for a lithium secondary battery of claim 1, wherein $R_1$ to $R_3$ are each independently methyl, ethyl, propyl, butyl, pentyl, hexyl, or heptyl; and L is ethylene, propylene, butylene, pentylene, hexylene, heptylene, octylene, nonylene, or decylene; ethylene, propylene, butylene, pentylene, hexylene, heptylene, octylene, nonylene, or decylene of L being further substituted with at least one substituent selected from the group consisting of methyl, ethyl, propyl, butyl, and pentyl, respectively.

3. The electrolyte for a lithium secondary battery of claim 1, wherein the silanyloxy nitrile compound is selected from silanyloxy nitrile compounds having the following structures:

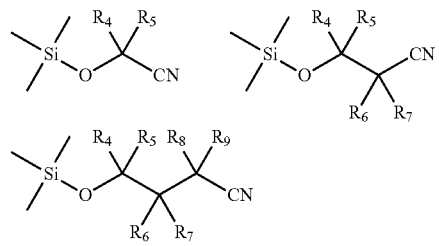

$R_4$ to $R_9$ are each independently hydrogen, methyl, ethyl, propyl, butyl, or pentyl.

4. The electrolyte for a lithium secondary battery of claim 1, wherein silanyloxy nitrile compound is contained at a content of 1 to 20 wt % based on a total weight of the electrolyte.

5. The electrolyte for a lithium secondary battery of claim 1, further comprising one or two or more additives selected from the group consisting of oxalatoborate based compounds, carbonate based compounds substituted with fluorine, vinylidene carbonate based compounds, and compounds containing a sulfinyl group.

6. The electrolyte for a lithium secondary battery of claim 5, further comprising an additive selected from the group consisting of lithium difluoro(oxalato)borate (LiFOB), lithium bis(oxalato)borate (LiB($C_2O_4$)$_2$, LiBOB), fluoroethylene carbonate (FEC), vinylene carbonate (VC), vinylethylene carbonate (VEC), divinyl sulfone, ethylene sulfite, propylene sulfite, diallyl sulfonate, ethane sultone, propane sultone (PS), butane sultone, ethene sultone, butene sultone, and propene sultone (PRS).

7. The electrolyte for a lithium secondary battery of claim 5, wherein the additive is contained at a content of 0.1 to 5.0 wt % based on a total weight of the electrolyte.

8. The electrolyte for a lithium secondary battery of claim 1, wherein the non-aqueous organic solvent is selected from cyclic carbonate based solvents, linear carbonate based solvents, and a mixed solvent thereof.

9. The electrolyte for a lithium secondary battery of claim 8, wherein the cyclic carbonate is selected from the group consisting of ethylene carbonate, propylene carbonate, butylene carbonate, vinylene carbonate, vinylethylene carbonate, fluoroethylene carbonate, and a mixture thereof, and the linear carbonate is selected from the group consisting of dimethyl carbonate, diethyl carbonate, dipropyl carbonate, ethyl methyl carbonate, methyl propyl carbonate, methyl isopropyl carbonate, ethyl propyl carbonate, and a mixture thereof.

10. The electrolyte for a lithium secondary battery of claim 8, wherein the non-aqueous organic solvent is a mixed solvent in which the linear carbonate solvent and the cyclic carbonate solvent are mixed at a mixed volume ratio of 1:1 to 9:1.

11. The electrolyte for a lithium secondary battery of claim 1, wherein the lithium salt is one or two or more selected from the group consisting of LiPF$_6$, LiBF$_4$, LiClO$_4$, LiSbF$_6$, LiAsF$_6$, LiN(SO$_2$C$_2$F$_5$)$_2$, LiN(CF$_3$SO$_2$)$_2$, LiN(SO$_3$C$_2$F$_5$)$_2$, LiCF$_3$SO$_3$, LiC$_4$F$_9$SO$_3$, LiC$_6$H$_5$SO$_3$, LiSCN, LiAlO$_2$, LiAlCl$_4$, LiN(C$_x$F$_{2x+1}$SO$_2$)(C$_y$F$_{2y+1}$SO$_2$) (here, x and y are natural numbers), LiCl, LiI, and LiB(C$_2$O$_4$)$_2$.

12. The electrolyte for a lithium secondary battery of claim 1, wherein the lithium salt is contained at a concentration of 0.1 to 2.0 M.

13. A lithium secondary battery comprising the electrolyte for a lithium secondary battery of claim 1.

* * * * *